Figure 1:
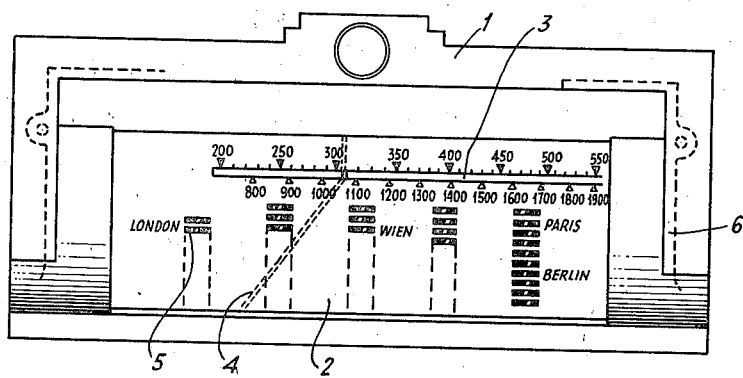

March 2, 1937.   J. B. L. VOLLENBROEK ET AL   2,072,189
TUNING INDICATOR
Filed Dec. 19, 1935

INVENTOR.
J. B. L. VOLLENBROEK
A. HOROWITZ
BY
ATTORNEY.

Patented Mar. 2, 1937

2,072,189

UNITED STATES PATENT OFFICE 2,072,189

TUNING INDICATOR

Johannes Bernardus Lambertus Vollenbroek and Alexandre Horowitz, Eindhoven, Netherlands, assignors to N. V. Philips' Gloeilampenfabrieken, Eindhoven, Netherlands Application December 19, 1935, Serial No. 55,160
In the Netherlands February 1, 1935

3 Claims. (Cl. 116—124.1)

This invention relates to tuning indicators, in particular for radio receiving apparatus. These devices commonly consist of a scale having on it a series of numbers indicating the wavelengths or the frequencies of the various stations and, as the case may be, a number of names of stations. It is customary to make the scale of transparent material and to illuminate it by means of a source of light arranged behind the scale. As the wavelengths of the stations are frequently altered, it is desirable that the scale should be interchangeable. The invention provides means of realizing this in a simple and cheap manner.

The indicator according to the invention has a scale consisting of a strip of transparent flexible material with which a strip of transparent paper on which occur the wavelengths or the names of the stations or both these indications is united in such manner that a unit of sufficient rigidity is produced which can easily be pushed in and slid out through a slit provided for this purpose. To that end, the scale should have sufficient rigidity. It is therefore formed by a double, preferably doubled-over, strip of transparent flexible material of sufficient rigidity, preferably celluloid, the paper being interposed between said two scale portions.

It is known to print the numbers indicating the wavelengths as well as the names of the stations directly on the scale consisting of celluloid. This is, however, a fairly expensive process. In the device according to the invention the names of the stations and the like are provided on paper so that when the wavelength of a station is altered one only has to interchange the paper, which may be effected practically without expense.

The invention will be explained more fully with reference to the drawing, which represents, by way of example, one embodiment thereof.

Figure 2:
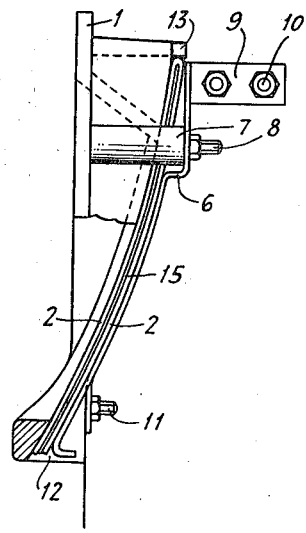

Fig. 1 represents a front elevation of an embodiment of the invention and Fig. 2 a lateral elevation partly in section.

The device substantially consists of a frame 1 having arranged in an aperture therein a scale 2 behind which a pointer 4 is movable which is coupled with the tuning mechanism. Part of this pointer is visible through a transparent scale portion 3 along which figures indicating the wavelengths are provided. On the scale are provided, in addition, series of names of stations. To each name of a station corresponds a transparent portion 5 provided in such manner that when the pointer is visible through said portion the receiver is tuned to the corresponding station. This manner of reading is, however, not essential for the invention but has only been given by way of example.

As will be seen from Fig. 2, the scale 2 consists of a doubled up strip of flexible transparent material such as celluloid. Between the two portions of this strip is located a transparent strip of paper 15 carrying the different notations. The scale can be pushed in and slid out through a slit 12. When being pushed in, it engages a lug 13 on frame 1 so that the correct position is always ensured. It is also possible to provide on the paper strip a linear rectangle in such manner that when this rectangle lies symmetrically with respect to the window the scale occupies its correct position. The scale is movable between guides formed by the frame 1 and by metallic strips 6 secured to the frame by means of bolts 8 and 11. The bolt 8 is secured to a member 7 which extends backwards from frame 1. The strips may form a unit with the guides 9 and 10 along which the pointing device is movable. The guides between which the scale is located are preferably slightly curved so that seen from the front of the receiver the scale is concave, a satisfactory mounting of the scale and, in addition, an easy manner of reading being thus obtained.

Having described our invention what we claim as novel and desire to secure by Letters Patent is:

1. Means for indicating the position of a tuning device comprising a panel having an opening therein, guide members mounted at the opposite sides of said opening said members being concave, a flexible graduated scale held in engagement with said guide members and a pointer connected to said tuning device and movable behind said scale.

2. A scale for indicating the position of a radio tuning device, comprising a thin sheet of inscribable material marked with the wavelengths of desired transmitting stations, a strip of thin, flexible, transparent material formed to engage both sides of said sheet and two curved guides spaced apart and arranged to grip the edges of said scale and retain it in a fixed position so that its front surface is concave.

3. A scale device for indicating the position of a tuning means and comprising a frame having a substantially rectangular opening therein, the rear surface of said frame at the edges of said opening being concave, a thin sheet of material marked with station designations; a thin, flexible strip of transparent material in close contact with both faces of said sheet, thin strips of flexible material curved to conform to the concave surface of said frame and in close engagement with the opposite edges of said flexible strip and an indicator connected to said tuning means and movable along said scale.

JOHANNES BERNARDUS
    LAMBERTUS VOLLENBROEK.
ALEXANDRE HOROWITZ.